July 26, 1955
K. R. GERMANN
2,714,050
PRINTING WHEEL ALIGNING MEANS
Filed Dec. 15, 1952
3 Sheets-Sheet 1
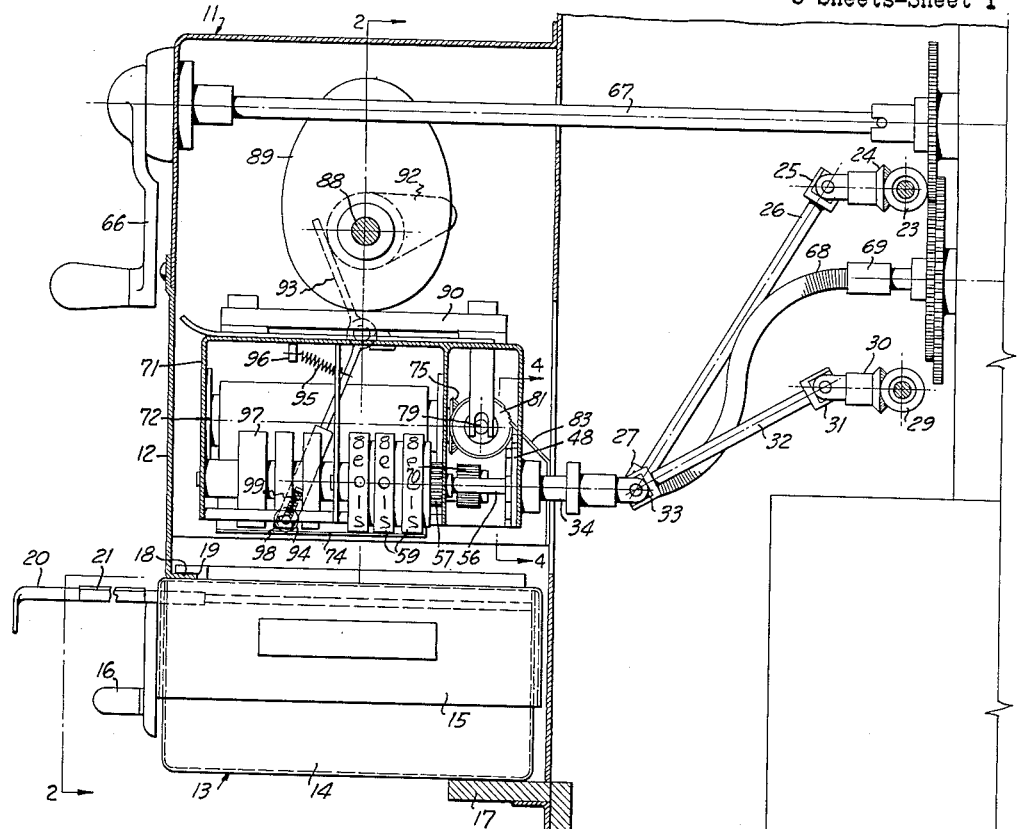
FIG_1_
FIG_8_
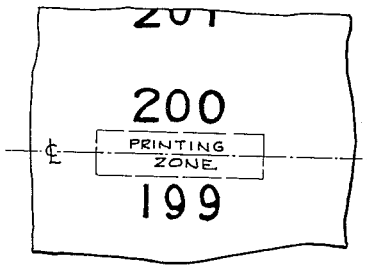
INVENTOR.
Kenneth R. Germann
BY
ATTORNEYS July 26, 1955  K. R. GERMANN  2,714,050
PRINTING WHEEL ALIGNING MEANS
Filed Dec. 15, 1952  3 Sheets-Sheet 2
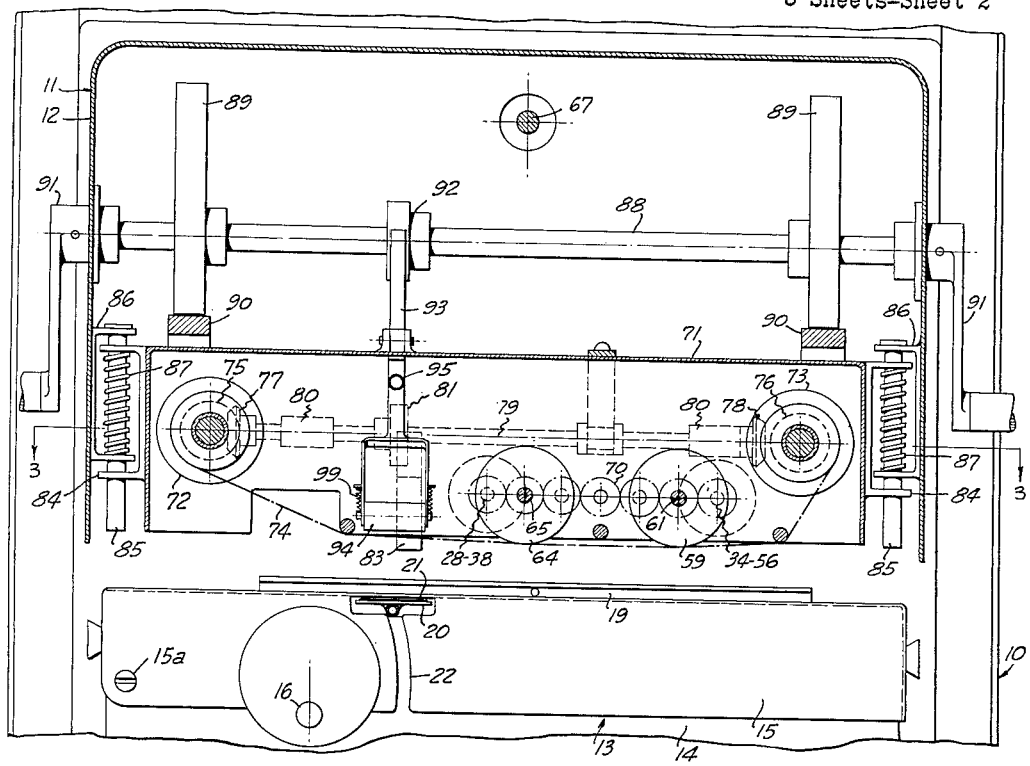
FIG_2_
FIG_3_
INVENTOR.
Kenneth R. Germann
BY
ATTORNEYS

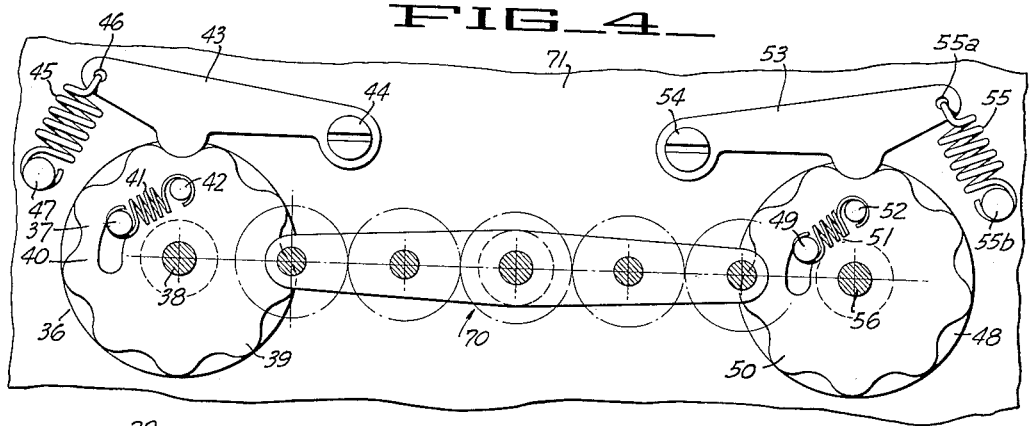
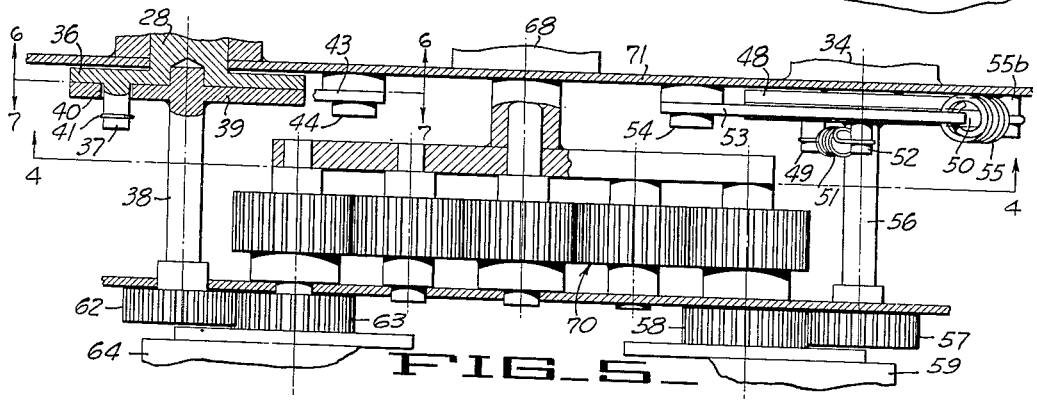
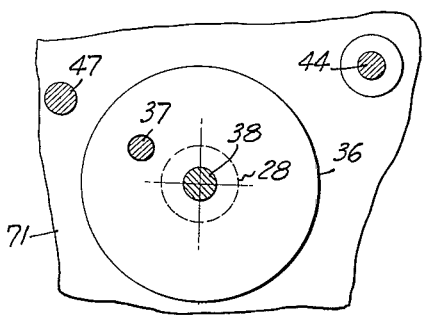
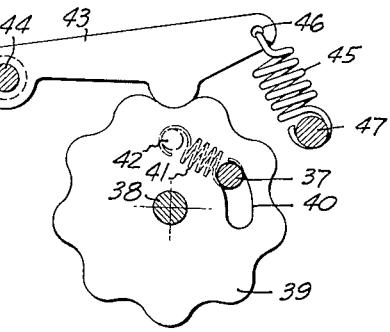

United States Patent Office 2,714,050
Patented July 26, 1955

2,714,050

PRINTING WHEEL ALIGNING MEANS

Kenneth R. Germann, Berkeley, Calif.

Application December 15, 1952, Serial No. 326,097

4 Claims. (Cl. 346—94)

This invention relates to a credit card computing device which is particularly adaptable to be used in connection with the credit cards of the type customarily used by the oil companies for distribution to auto and truck owners and in connection with the retail sales and distribution of gasoline and petroleum products by service stations. This device may also be used with other types of tabulation cards or systems such as those put out by the International Business Machines Corporation. More particularly, this device relates to a type of instrument which may be positioned adjacent to or within the present day conventional gasoline pump and which is actuated thereby for the purpose of printing the sales invoice with certain specific information, such as the number of gallons of gasoline dispensed, unit price, total price, the name of the customer, the name of the station, and other information which may be deemed pertinent.

There are many different methods for the use of credit cards, but the system most widely used by oil companies is one where an identification card is distributed by the company to the prospective purchaser. When the purchaser buys the products of this particular oil company he may present this credit card to the service station attendant who transcribes information therefrom to invoices which may be made in triplicate with the original going to the distributing company, a copy to the purchaser, with the third copy remaining in the service station files for future reference. Other copies may be made to suit any particular accounting systems. This system is subject to many disadvantages. For example, errors in transcription of the identifying material from the purchaser's credit card to the invoice frequently results in bookkeeping errors in connection with the charging of purchases to the proper accounts. Furthermore, illegible or mistaken transcription of material from the computing mechanism on the conventional gasoline pump frequently results in errors as to gallonage and price. This system is also subject to the greater disadvantage that it consumes a lot of the service station attendant's time in preparing the invoices and other bookkeeping operations. This causes a long wait by customers and materially reduces the number of customers which attendants can handle. Substantial savings would result if a credit card system eliminating many of these steps could be devised.

In my co-pending application, Serial Number 250,506 entitled "Credit Card Computing Device" I have disclosed a similar apparatus. The purpose of the present application is to disclose distinct improvements over the prior device.

It is an object of this invention, therefore, to provide a simple credit card computing arrangement which will make transcription of the identifying material from the credit card and other information from the computing dials of the pump to the invoice more accurate and thereby eliminate mistakes.

It is another object of this invention to provide a device of this character which may be used in conjunction with the conventional gasoline pumps without requiring substantial replacement of these pumps by the oil companies.

Another object of this invention is to provide a device of this character which will require only a small part of the service station attendant's time.

It is a further purpose of this invention to provide a device of the character described which will advance the printing wheels in such a manner that the gallonage and total price will always be in a printing position even though the pump has been stopped so that the pump totalizing mechanism has only advanced partially from one number to the next.

Other objects and advantages of this invention will appear from the following specification taken in conjunction with the accompanying drawings in which:

Figure 1 is a cross-sectional view of my credit card computing device and the method of connecting the same to a computing and totalizing mechanism of the conventional gasoline pump, and also the method for fastening my device to the side of the conventional gasoline pump;

Figure 2 is a cross-sectional view taken along the line 2—2 of Figure 1 showing the printing mechanism with its associated apparatus.

Figure 3 is a cross-sectional view taken along the line 3—3 of Figure 2 showing a plan view of the printing wheels and associated gearing.

Figure 4 is an enlarged detail of the two hill and dale gear assemblies and the reset gearing taken along the line 4—4 of Figure 1.

Figure 5 is an enlarged detail view of the printing wheel advance mechanism and the associated gearing shown in Figure 3.

Figure 6 is an enlarged elevational detail of the driving wheel of one of the hill and dale gear assemblies taken along the line 6—6 of Figure 5.

Figure 7 is an enlarged elevational detail of the driven gear in the hill and dale gear assembly taken along the line 7—7 of Figure 5.

Figure 8 is a graphic illustration as to what might occur on a conventional printing mechanism.

My credit card computing device is generally mounted on the side of the conventional gasoline pump although it may be placed within the housing of the conventional pump without departing from the spirit of this invention. The embodiment of my invention as shown in Figure 1 is mounted on a conventional pump 10. My device consists of a unit which is maintained within an enclosure 11, said enclosure consisting of a stationary portion 12 and a removable tray assembly 13. The tray assembly 13 consists of a tray 14 and a removable cover 15 capable of being swung open on a hinge member 15a as shown in Figure 2. The tray assembly 13 contains a conventional multiple invoice advancing device which is driven by a handle 16. This invoice advancing mechanism does not constitute a part of this invention and any standard means such as disclosed in my co-pending application will be satisfactory.

The tray assembly 13 is supported by member 17 and by lip 18 which extends into a groove 19. The supporting members 17 and 18 are arranged in such a manner that the tray assembly 13 can be slid out from its recessed position into such a position that cover 15 may be opened and invoices removed.

Tray assembly 13 is also provided with a slide 20 which has a slot 21 which permits the insertion of a credit card of the type in which the identifying material thereon is embossed or raised. When the credit card is inserted in slot 21 and slide 20 is pushed into its innermost position, transcription may take place. The method of transcription will be fully described subsequently. Tray assembly 13 is also provided with a slot 22 which will permit the opening of cover 15 without removing the handle of slide 20.

A beveled gear 23 is driven directly by the price computer mechanism of the conventional gasoline pump which engages bevel gear 24 which, through a coupling arrangement 25 drives shaft 26 which in turn through another coupling 27 drives shaft 28 shown in Figure 5. Referring again to Figure 1, bevel gear 29 is driven by the gallonage totalizer of the conventional gasoline pump and engages bevel gear 30 through coupling 31 to drive shaft 32 through coupling 33 which in turn drives shaft 34 shown in Figure 5.

Referring now to Figure 5, shaft 28 is driven by the price totalizer of the conventional gasoline pump as hereinbefore described and this shaft 28 has rigidly mounted upon its driving wheel 36 which has a pin 37 extending vertically from its surface. Pin 37 causes rotation of hill and dale gear 39 affixed to shaft 38 by tensioning spring 41 attached to pin 42 which is vertically mounted on gear 39 and thus advancing gear 39 by overcoming the effect of pawl 43. Hill and dale gear 39 is provided with an arcuate slot 40 approximately 36° in length in which pin 37 of wheel 36 may move freely except for the action of spring 41. A pawl 43 is so shaped that it will engage the dales of the hill and dale gear 39 and tend to retard the movement of hill and dale gear 39 in counteraction to the action of spring 41. Pawl 43 is mounted on pin 44 in such a manner that it may reciprocate upwardly and downwardly and spring 45 is connected through hole 46 to pin 47 to tend to prevent the upward motion of pawl 43 and thus to retard the forward rotation of hill and dale gear 39.

The operation of one of the hill and dale gear assemblies is as follows: As shaft 28 drives wheel 36 and hence pin 37, pin 37 will begin to move in slot 40 and at the same time will begin to stress spring 41 in such a manner that the spring 41 will tend to pull pin 42 in the direction that pin 37 is rotating. Because of the tension on spring 45 pawl 43 will frictionally engage the hills and dales of gear 39 and will tend to retard movement of gear 39. However, as soon as pin 37 has moved sufficiently to stress spring 41 to such an amount that it will pull gear 39 forward by overcoming the downward pressure of pawl 43, gear 39 will be advanced to the next position. As long as gasoline is being pumped pin 37 will be moving and the above described intermittent action will be repeated.

Once the computer of the dispensing pump has been stopped and pin 37 has stopped rotating, stored energy in spring 41 will place the printing wheels in a proper printing position. If the pin 37 has not advanced to the flip-over point, the energy stored in spring 41 will not be sufficient to advance the hill and dale gear to the next number and it will remain on the previous number, but if pin 37 has advanced beyond the flip-over point, the stored energy will be sufficient to advance the hill and dale gear to the next number. Thus the printing wheels will never stop in between two numbers. Therefore, no matter where the computing mechanism on the dispensing pump stops, the printing wheels in my device will be in a printing position at all times. Hence the use of this hill and dale gear assembly in this device makes it possible to eliminate the stopping of printing wheels in such a position that printing will not take place or in a position which will allow multiple or partial printing. The action of the printing wheels will be described subsequently.

In one design, which I have found very satisfactory, the slot 40 was made 36° in length and the tensions of springs 41 and 45 were so adjusted that the flip over from one number to the next occurred immediately after pin 37 had progressed halfway to the next number.

If spring 41 should fail, the hill and dale gear assembly will continue to operate as pin 37 will come to the end of slot 40 and will still advance the hill and dale gear.

Shaft 34 drives the hill and dale gear assembly which is similar to that driven by shaft 38. The assembly is composed of wheel 48, which is driven by shaft 34, and pin 49 which serves to drive hill and dale gear 50 by means of a spring 51. Spring 51 is connected to pin 49 and pin 52 of hill and dale gear 50. Pawl 53 reciprocates on pin 54 and is kept in constant contact with hill and dale gear 50 by means of spring 55 attached through hole 55a in pawl 53 to pin 55b on framework 71.

This intermittent action of hill and dale gear 50 is transmitted to shaft 56 to drive gear 57 which drives gear 58 which in turn drives a plurality of printing wheels 59a, 59b, and 59c, which as indicated, are provided with raised numeral portions 60. The printing wheels 59 are adapted to be driven on the shaft 61 in a manner well known to those skilled in the art. This counter is one in which the printing wheel 59a will make one complete revolution for every one-tenth of a revolution of printing wheel 59b. Likewise printing wheel 59b will make one complete revolution for every one-tenth revolution of printing wheel 59c.

In this manner it will be apparent that the gallons dispensed will be simultaneously recorded on the totalizer on the conventional gasoline pump and on the printing wheels 59.

In the same manner shaft 38 which is driven by the price totalizer of the conventional pump, drives gear 62 which drives gear 63 which in turn, drives a plurality of printing wheels 64a, 64b, and 64c with raised numeral portions 60a on shaft 65. In this manner the total price shown on the conventional gasoline pump will be simultaneously shown on the printing wheels 64. The numeral wheel 64a represents units of one cent, the numeral wheel 64b represents a unit of ten cents and the numeral wheel 64c represents units of one dollar.

The price and gallonage computers on the conventional gasoline pump are adapted to be returned to zero by the turning of crank 66 which turns shaft 67. This reset mechanism is also connected through coupling 69 and flexible shaft 68 to drive a gear assembly 70 which, when the reset mechanism is operated, will return the printing wheels 59 and 64 to zero so that they are ready for operation on the next sale.

This printing assembly hereinbefore described is adapted to be supported within a framework 71 which comprises a box-like portion with its bottom side open. Framework 71 supports a pair of spindles 72 and 73 upon which a printing ribbon 74 is wound. Each of the spindles 72 and 73 is provided at one end with a bevel gear 75 and 76 respectively which is adapted to mesh with a similar bevel gear 77 and 78 mounted upon a rotatable shaft 79. The shaft 79 may be reciprocated in such a manner that either set of bevel gears will be engaged so that the ribbon may be reversed or advanced at any time. Shaft 79 is supported by bearings 80 and has mounted upon it gear 81 which, as indicated in Figure 2, is positioned adjacent to an opening 82 in the member 71. The leaf spring member 83 which is secured to a stationary portion of my device is adapted to engage tooth gear 81.

The entire assembly when mounted in framework 71, including the ribbon 74 and its respective spindles, the ribbon wind and rewind mechanism, and the totalizer mechanism previously described is mounted in a resilient manner so that the same may be reciprocated upwardly and downwardly. Four brackets 84 extend outwardly from the framework 71 and are provided with openings so that the entire framework 71 with its assembly may be reciprocated on the vertical shafts 85 which are maintained in a fixed position by end brackets 86. Springs 87 urge the entire assembly 71 into an upward position, but, as previously pointed out, this assembly is adapted to be reciprocated upwardly and downwardly against the pressure of springs 87. This is accomplished by the rotation of shaft 88 which carries the cams 89 which engage the pads 90 on top of the assembly 71. Rotation of the shaft 88 is accomplished by manual operation of the crank 91.

When the crank 91 is turned, the cams 89 are likewise rotated with the result that they urge assembly 71 downwardly from the position illustrated in Figure 2 until the printing tape 74 engages the upper surface of the invoice held by tray assembly 13. Further downward movement of the member 71 causes the printing wheels 59 and 64 respectively to record the information upon the invoice by engagement of the printing wheels with ribbon 74 and the invoice.

Mounted upon shaf 88 is a cam 92 which engages a wiping arm 93, containing roller 94 which is adaptable to move upwardly and downwardly in slot 98 on wiping arm 93. Spring 99 is provided to force the roller 94 into constant contact with the ribbon 74 to engage the invoice so that the information on the credit card placed in slide 20 will be imprinted upon the invoice also. The wiping arm 93 is returned to normal position by spring 95 which is attached to the wiping arm 93 and a pin 96 projecting from framework 71.

In addition to the foregoing a date stamp arrangement 97 may be installed and although the same is preferably advanced manually it may be advanced by a suitable clock mechanism.

Operation of the entire device may be briefly described as follows: It must be assumed that the operator has actuated the reset mechanism which, it will be recalled, is controlled by the operation of crank 66 and that the totalizers on the conventional gasoline pump and the printing wheels 59 and 64 are reset at zero.

As gasoline is being delivered, the totalizing mechanism of the pump will be operated which in turn will operate the printing wheels 59 and 64 of my device.

When the flow of gasoline through the pump is terminated, the stored energy of the hill and dale gear assemblies will place printing wheels 59 and 64 in accurate printing position. At no time will the printing wheels be so positioned that they will be in between two numbers as shown in Figure 8. If the printing wheels were in the position shown in Figure 8, no imprint would be made upon the invoice as the figures would be outside the printing zone. If the printing zone were larger multiple printing could occur, that is, both sets of figures or portions of the figures would be printed. Intermediate positions between the halfway mark could also result in partial printings of the figures. It is the purpose of my invention to eliminate such possibilities by using intermittent motion and stored energy obtained through the use of the hill and dale gear assemblies hereinbefore described.

During the dispensing operation the credit card may be inserted in the slot 21 in such a manner that the embossed or raised portions thereof immediately underlies the invoices which are supported by the tray assembly 13.

By rotating the crank 91 the entire framework 71 is reciprocated downwardly against the tension of the springs 87 until such time as the printing ribbon 74 engages the upper surface of the invoice. The information on the printing wheels is then recorded upon the invoice. Crank 91 also operates roller 94 which wipes across the portion of the invoice above the credit card in such a manner that the information of the credit card is transferred to the invoices. The downward movement of framework 71, spring 83 being in engagement with gear 81, also serves to advance the gear 81 an additional notch which in turn advances the ribbon 74 the desired amount.

After the printing operation has been completed, the tray 14 may be drawn from beneath the assembly 13, and after being signed by the customer, the invoice may be withdrawn and given to the customer.

From a study of this operation it is apparent that a great deal of time for the station attendant may be saved by the use of this device. The computation is completed upon the completion of the filling of the customer's tank and the station attendant's time consumed by the bookkeeping operation is reduced to a minimum. Also the time necessary to serve a customer is reduced substantially thereby leaving the dispensing pumps open for subsequent customers.

The objects and advantages of this invention have been pointed out. Other objects and advantages may occur to particular users and various types of accounting systems may be adapted to be used with my computing device.

One of the principal advantages of my invention is that at no time will the printing wheels stop in such a position that a number on each wheel will not be in printing position. This is accomplished by the hill and dale assemblies as hereinbefore described. Most printing indicators are subject to the objection that there is a possibility that one or more of the printing wheels will not be advanced to a printing position when the dispensing process has been completed as shown by the possibility illustrated in Figure 8. In this figure the printing wheel has advanced one-half of the distance between 199 and 200 which would mean that no imprint would be made upon the invoice. This is a very serious objection which has been remedied by my invention. I also wish to point out that in my invention it is possible by adjusting the tensions in the two springs in each hill and dale gear assembly to set the exact moment at which the next numeral will be advanced. Normally, this setting would be such that advancement to the next numeral would occur at a point when the first computer wheel on the conventional gasoline pump had advanced halfway to the next numeral.

The use of the embossed credit card is of course unnecessary, although it would generally be considered desirable. Any amount of desired information could be placed on this credit card. If the use of the credit card was eliminated, my device could still be used by having the station attendant place the customer's name on the invoice and then using the device to print the total gallons and total price information on the invoice.

If other products are sold to the customer at the same time, these may be listed upon the invoice by the attendant. This would not occur very often, as generally most sales will consist only of gasoline.

I claim:

1. In an invoice printing device for totalizing pump having a plurality of printing wheels, invoice retaining means, an embossed credit card retaining means, a printing ribbon disposed between the invoice in said invoice retaining means and the printing wheels, and means for bringing the invoice into contact with said printing wheels and with an embossed credit card in said holding means; means for translating the continuous rotary motion of the totalizer of said pump into intermittent step-by-step motion to intermittently rotate the printing wheels from one predetermined printing position to another predetermined printing position comprising a driving shaft connected to said totalizer, a driving disc fixed on said shaft, a parallel driven disc connected to said printing wheels, lost motion means inter-connecting said two discs, spring pressed detent means engaging said driven disc for retaining said printing wheels at one predetermined printing position until the driving disc has advanced one half of the angular distance between adjacent numbers on one of the printing wheels, and means for storing energy for advancing said driven disc to the next predetermined printing position when said driving disc has advanced more than one half of the angular distance between adjacent numbers on one of the printing wheels.

2. In an invoice printing device for a totalizing pump having a plurality of printing wheels, invoice retaining means, an embossed credit card retaining means, a printing ribbon disposed between the invoice in said invoice retaining means and the printing wheels, and means for bringing the invoice into contact with said printing wheels and with an embossed credit card in said holding means; means for translating the continuous rotary motion of the totalizer of said pump into intermittent step by step motion to intermittently rotate the prining wheels from one predetermined printing position to another predetermined printing position comprising a disc connected to the printing wheels and having a plurality of equally spaced hills and dales on its outer periphery, the angular distance between adjacent dales being equal to the angular distance between adjacent numbers on the printing wheels, a second disc coaxially aligned with said first named disc and connected to said totalizer on said pump, a lever having a projection adapted to engage said dales in said first named disc, spring means for urging the projection into the dales, lost motion means interconnecting the first and second discs, spring means interconnecting said first and second discs, said spring means on said lever and said last named spring means being tensioned so that movement of the projection from one dale to the next occurs when the second disc is moved slightly more than one half of the angular distance between adjacent numbers on one of said printing wheels.

3. In an invoice printing device for a totalizing pump having a plurality of printing wheels, invoice retaining means, an embossed credit card retaining means, a printing ribbon disposed between the invoice in said invoice retaining means and the printing wheels, and means for bringing the invoice into contact with said printing wheels and with an embossed credit card in said holding means; means for translating the continuous rotary motion of the totalizer of said pump into intermittent step by step motion to intermittently rotate said printing wheels from one predetermined printing position to another predetermined printing position comprising a driving shaft connected to said totalizer, a coaxially aligned driven shaft connected to said printing wheels, a driving disc mounted on said driving shaft, a parallel driven disc mounted on said driven shaft, said driven disc having a plurality of equally spaced hills and dales on its outer periphery, the angular distance between adjacent dales being equal to the angular distance between adjacent numbers on the printing wheels, a lever having a projection adapted to engage the dales in said driven disc, spring means for urging the projection on said lever into said dales, lost motion means interconnecting the driving and driven discs, spring means interconnecting said driving and driven disc, said spring means in said lever and said last named spring means being so tensioned that movement of the projection from one dale to the next occurs when the driving disc has moved slightly more than one half of the angular distance between adjacent numbers on one of the printing wheels.

4. A device as in claim 1 wherein the totalizing pump has total gallonage indicating means and total price indicating means and wherein a pair of translating means are used for intermittently rotating two sets of printing wheels, one set indicating total gallonage and the other set indicating total price, together with means for resetting both sets of printing wheels to zero in one operation.

References Cited in the file of this patent

UNITED STATES PATENTS

| | | |
|---|---|---|
| 2,155,594 | Hart | Apr. 25, 1939 |
| 2,169,049 | Hunter | Aug. 8, 1939 |
| 2,328,435 | Eickmeyer et al. | Aug. 31, 1943 |
| 2,500,381 | Rockola | Mar. 14, 1950 |
| 2,554,296 | Crews | May 22, 1951 |